(12) United States Patent
Matthes et al.

(10) Patent No.: US 7,143,882 B2
(45) Date of Patent: Dec. 5, 2006

(54) DISK FOR A FORCE TRANSMITTING AGGREGATE

(75) Inventors: Bernd Matthes, Schriesheim (DE); Karl-Heinz Bauer, Graben-Neudorf (DE); Emilio Fabricius, Oftersheim (DE); Harald Merkel, Sinsheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/617,461

(22) Filed: Jul. 11, 2003

(65) Prior Publication Data

US 2004/0050646 A1 Mar. 18, 2004

(30) Foreign Application Priority Data

Aug. 1, 2002 (EP) .................. 02017312

(51) Int. Cl.
*F16D 13/64* (2006.01)
(52) U.S. Cl. .............. 192/52.3; 192/107 R; 192/107 C
(58) Field of Classification Search ............ 192/107 R, 192/107 C, 52.3, 52.6, 52.2, 70.14, 113.36
See application file for complete search history.

(56) References Cited

U.S. PATENT DOCUMENTS

| | | | | |
|---|---|---|---|---|
| 1,081,998 A | * | 12/1913 | Whitcomb | ............. 192/107 R |
| 1,777,399 A | * | 10/1930 | Daukus | ................ 192/107 C |
| 1,810,360 A | * | 6/1931 | Loeffler | ................ 192/107 C |
| 1,883,682 A | * | 10/1932 | Gamble | ................ 192/52.3 |
| 1,904,953 A | | 4/1933 | Saks | |
| 2,038,016 A | | 4/1936 | Wemp | |
| 2,054,872 A | * | 9/1936 | Whisler et al. | ......... 192/107 R |
| 2,096,587 A | * | 10/1937 | Katcher | ............... 192/107 C |
| 2,097,710 A | * | 11/1937 | Whitelaw et al. | ....... 192/107 C |
| 2,180,086 A | * | 11/1939 | Kraft | ............... 192/107 R |
| 3,073,424 A | * | 1/1963 | Russell | ................ 192/107 R |
| 3,397,761 A | * | 8/1968 | Lindquist | ............. 192/107 C |
| 3,841,949 A | * | 10/1974 | Black | ................ 192/107 M |
| 3,897,860 A | | 8/1975 | Borck et al. | |

(Continued)

FOREIGN PATENT DOCUMENTS

DE 31 18565 A1 5/1981

(Continued)

OTHER PUBLICATIONS

Holzer et al. VDI—report FVA 290, Schleppmomente an nasslaufenden Lamellenkupplengen; Leerlaufverhalten ölegkühlter Lamellenkupplungen;—Abschlußbericht—; Berichtszeitraum 1995—1998.

(Continued)

*Primary Examiner*—Rodney H. Bonck
(74) *Attorney, Agent, or Firm*—Emch, Schaffer, Schaub & Porcello, Co., L.P.A.; Greg Dziegielewski

(57) ABSTRACT

Disk (1, 11) for a force transmitting aggregate, in particular for wet disk clutch, with a core plate (2, 12) exhibiting a front side (V) and a backside (R), wherein the front side (V) and/or the backside (R) exhibits a friction lining (3v, 3r, 13v) which may be provided with grooves (4a, 4b, 5a, 5b, 5c, 14a, 14b, 15a, 15b, 15c). In accordance with the invention, in the case of a friction lining with an essentially planar surface ($O_{3v}$, $O_{3r}$, $O_{13v}$) at least one surface area (6) is provided which is raised in comparison to this planar surface ($O_{3v}$, $O_{3r}$, $O_{13v}$) and exhibits a spring characteristic. Alternatively thereto, it is envisioned in accordance with the invention that the cross-sectional area of the lining increases or decreases in the radial direction.

11 Claims, 2 Drawing Sheets

U.S. PATENT DOCUMENTS

| | | | | |
|---|---|---|---|---|
| 3,982,611 A | * | 9/1976 | Gannon | 192/70.14 |
| 4,042,085 A | * | 8/1977 | Bjerk et al. | 192/70.14 |
| 4,287,978 A | * | 9/1981 | Staub, Jr. | 192/107 R |
| 5,092,443 A | | 3/1992 | Nomura | |
| 5,358,086 A | | 10/1994 | Muller et al. | |
| 6,138,806 A | | 10/2000 | Schierling | |

FOREIGN PATENT DOCUMENTS

| | | |
|---|---|---|
| DE | 35 32 759 C1 | 9/1985 |
| GB | 2 260 168 A | 4/1993 |

OTHER PUBLICATIONS

FVA research report of Forschungsvorhaben Nr. 53/II; Forschungsheft Forschungsvereinigung Antriebstechnik E.V.; Lamellenwellung; Untersuchung des Einflusses einer Sinuswellung der Stahllamellen auf das Leerlaufverhalten von Lamellenkupplungen mit der Reibpaarung Stahl/Sinterbronze bei unterschiedlicher Reibflächengestaltung;—Abschulβbericht—Heft 135 1982.

* cited by examiner

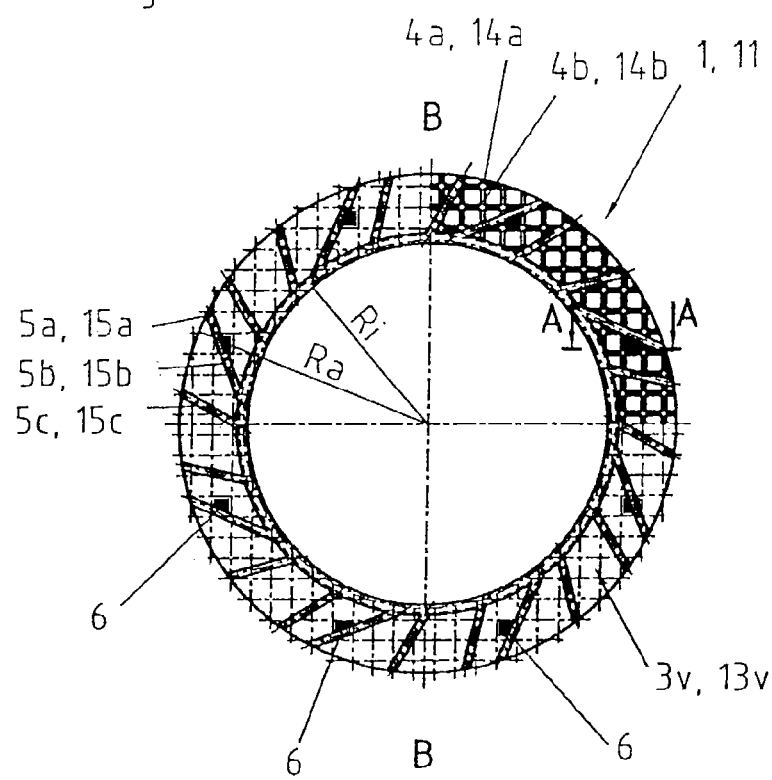
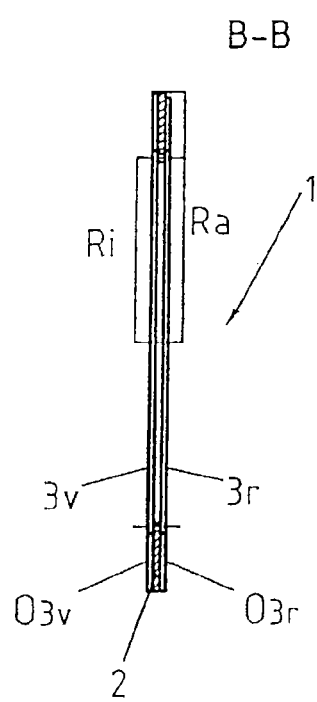
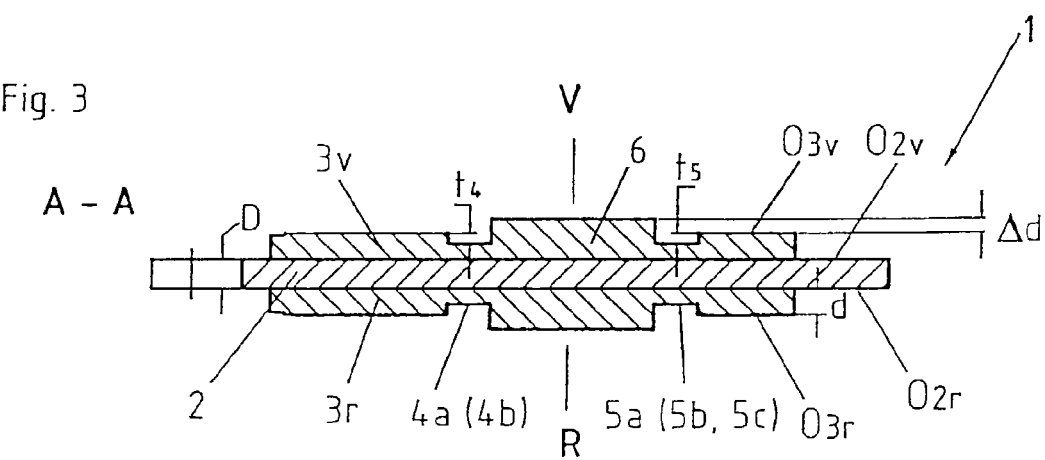

DISK FOR A FORCE TRANSMITTING AGGREGATE

DESCRIPTION

The invention concerns a disk for a force transmitting aggregate, in particular for a fluid disk clutch as well as a friction lining for a disk of this type.

Force transmitting aggregates, in particular wet disk clutches of the above-described type, include a plurality of disks. Conventionally therein a first group is fixed against rotation upon a disk core plate or, as the case may be, drivable upon a disk core plate, while a second group is mounted drivable upon a driving collar or hub. The respective disks of the two groups engage with each other in the manner of teething or inter-digitation. The groups are preferably displaceable in axial direction relative to each other and can in this manner be brought pair-wise into frictional engagement. Disk clutches of the above-described type are described for example in DE 31 18 565 A1 or DE 35 32 759 C1.

According to the state of the art various variations of disks are known. It is for example known to form one of the groups of disks as simple steel disks and the other group as disks bonded preferably on both sides with a friction lining, so-called friction plates. Further, it is also possible to form both groups as bonded disks, wherein as a rule one side is provided with a friction lining, wherein in general two disks thereby come respectively into frictional contact when moved towards each other, so that respectively the core plate metal of one disk comes into contact with the friction lining of the adjacent disk. Beyond this, it is known to provide the front side and/or the backside of the respective disks with notches or grooves, which again can be formed in the most diverse design and manner.

The preferably annular or ring shaped bonded disks are, as a rule, arranged sandwich-like. They include—as already indicated above—a ring shaped core plate exhibiting a front side and a back side, most commonly a core plate made of steel, which carries a so-called friction lining on one side in the case of a so-called single sided friction plate and on both of its ring surfaces in the case of a double sided friction plate. This friction lining is comprised in general of a fibrous mask, which is produced of a paper like material.

The drag torque of the force transmitting aggregates, in particular of wet disk (clutches) of automated manual or automatic transmissions, as described for example in Holzer et al., VDI-report FVA 290, "Schleppmomente an nasslaufended Lamellenkupplungen", of the above described type depend upon the most diverse parameters. When the disk clutch turns while in the open condition, then both groups of disks (for example bonded disks and steel disks) have different rotational speeds and the oil film present between them provides a torque (and in particular also a drag torque) from the driven onto the non-driven parts of the clutch aggregate. In this type of wet disk (-clutches) of automated manual or automatic transmissions it was determined that the coefficient of drag is increased when the oil is in the cold state, and individual disks even stick together. This is to be avoided.

According to the state of the art, a sticking together of disks is prevented by pushing the individual disks apart from each other by a package of springs provided between the disks. This embodiment is for example the subject of matter of FVA research report of Forschungsvorhaben Nr. 53/II in Forschungsheft Forschungsvereinigung Antriebstechnick, Heft 135, 1983.

A further variation according to the state of the art envisions bent-off segments at the sides of the disks which insure a positive or forced separation. This variant is described in detail in U.S. Pat. No. 3,897,860.

Both above-mentioned variants however can only be produced by techniques which are very expensive, so that comparatively high costs occur during their manufacture.

The invention is thus concerned with the task of providing a disk or, as the case may be, a friction lining, with which a force transmitting aggregate, in particular a wet disk clutch, can be realized, which exhibits a low co-efficient of drag even at low temperatures and which is substantially more economical to produce.

This task is inventively solved by a disk or, as the case may be, a friction lining.

Advantageous embodiments and further developments of the invention are set forth in the dependent claims.

The essential concept of the invention is comprised in taking advantage of the fact that the friction lining itself acts as a spring. In concrete terms, it is provided that the friction lining exhibits at least one surface area raised in comparison to the remaining plane of the surface. This partially raised portion of the friction surface maintains, during the opened position of the disk clutch, a defined separation between adjacent disk surfaces with respect to each other. A forced separation of adjacent disks is in this manner achieved without supplemental measures. Therein it is unimportant whether both facing frictional surfaces of adjacent disks exhibit raised surface area in the above described manner and mode, or whether only each respective second surface is correspondingly so formed or designed. The person of ordinary skill would immediately recognize that the inventive function is also then realized, when for example one of the above described groups of a disk clutch is formed in the manner of bonded disks and the other group in the manner of steel disks, without friction cladding.

It has been found, that in the loaded condition (in the case of suitable selection of the relationship of raised surface to not raised surface) the rise is "over compressed" and thus is no longer effective. It has further been shown, that the above-described function of the force transmitting aggregate also is effective at low temperatures, far below the freezing point.

In a first advantageous embodiment of the invention it is envisioned that the raised surface areas are formed unitarily with the remaining friction cladding. A one-piece design is already then of advantage, when thereby the manufacturing process allows itself to be simplified so that production can be more economical. A person of ordinary skill in the pertinent art can offer an endless number of possibilities for the manufacture of a one-piece embodiment of a disk or a corresponding friction cladding. From among this large number of possible solutions, two variants which are particularly advantageous are described in the following:

A first variant of the invention envisions that the friction lining, at least in the raised area of the surface, exhibits a greater thickness than the remaining areas. This form of embodiment presents itself favorably particularly for the reason that during the application of the friction lining upon the disk as well for incorporation of notches or grooves in the friction lining the upper surface of the friction lining must be at least partially compressed or removed anyway. During the manufacturing of the presently described friction lining the person of ordinary skill can insure that during the moulding of the grooves into the friction lining the surface is in parts less compressed or removed, so that the presently described raised areas remain standing. This variant offers itself particularly then, when the friction lining is applied upon a planar or flat carrier or core plate surface.

In principle it is however also possible to have the core plate with its flat front and back surfaces itself exhibiting raised surface areas, so that a friction lining applied thereupon with an essentially homogeneous thickness at the end is raised in this area with respect to the remaining planar surface. It must however be noted, that the height of the raised surface when under pressure must make possible a planar friction surface.

In simple manner this variant allows itself to be achieved in that the core plate material exhibits a greater thickness in these areas than in the remaining areas. One could however also imagine as an alternative that the core plate is deformed, forming raised areas in the appropriate parts. The latter variant is particularly suitable for application in so-called single-sided disks. In the manufacturing technology this allows itself to be realized in particularly simple manner, in that the backside of the disk is processed on the appropriate parts or areas with the aid of a stamping or press tool, so that the friction lining on the front side is correspondingly bent outward.

It is envisioned in accordance with the invention that the friction lining as such possesses a spring-like characteristic. It can however also be sufficient when essentially only the raised surface areas are formed to be spring-like. The latter case in particular demonstrates that a multi-component embodiment of the friction lining can be useful, for example in that spacers are introduced or incorporated into the friction lining.

It has been found that the most diverse shapes or forms are suitable for the design of the raised surface areas. The corresponding raised surface areas can in particular be formed planar, bowed out or curved as an arc, or conically raised.

In place of providing raised surface areas with respect to an essentially planar or flat surface of a friction lining, it has been found to be of advantage in accordance with the invention, to form the upper surface of the friction lining itself not planar parallel, but rather preferably rising or falling in the radial direction. It has been found particularly advantageous when a linear rise or fall is provided, so that a conical cross-sectional profile results.

Particularly advantageous embodiments of the invention are shown in the drawings and are described in greater detail in the following.

The present invention is generally directed to a

BRIEF DESCRIPTION OF THE DRAWINGS

There is shown:

FIG. 1 an inventive disk (friction plate) in top view

FIG. 2 an inventive disk (friction plate) according to FIG. 1 in the section B—B FIG. 3 a first embodiment representing an inventive disk (friction plate) according to FIGS. 1 and 2—section view along A—A FIG. 4 a second embodiment for illustration of an inventive disk (friction plate) according to FIGS. 1 and 2—section view along A—A FIG. 5 illustrative embodiment of the raised surface areas according to FIGS. 1–4, representation of the disk in cross-section
  a) bow-shaped curved surface contour
  b) flat surface
  c) conical cross-section FIG. 6 a third illustrative embodiment of an inventive disk in cross-section

DETAILED DESCRIPTION OF THE PREFERRED EMBODIMENTS

Figure 4:
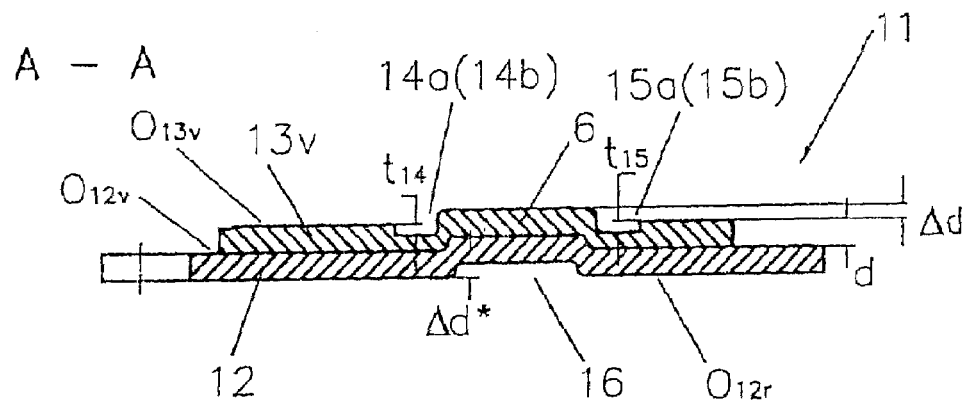

FIG. 1 shows an inventive friction plate 1, 11 for a wet disk clutch in top view looking on the front side V.

The friction plate 1, 11 is ring shaped, shown in the drawing defined by reference numbers indicating radius $R_i$ (inner radius) and $R_a$ (outer radius).

The cross-sectional representation according to FIG. 2 shows that the disk 1, 11 has the shape of a flat plate. The disk 1, 11 itself is comprised of a core plate 2, which generally is made of steel. The core plate 2 carries a friction lining 3v, 13v, 3r on at least one of its ring surfaces. As the disk 1 is provided on both sides with a friction lining, then it is referred to as a so-called double-sided friction plate. A double-sided friction plate of this type is characterized in the following with the reference number 1. The corresponding friction lining on the front side V or as the case may be on the backside R of the core plate 2 is provided in the figure with the reference number 3v and 3r.

In the case that the disk is provided with a friction lining only on one side (for example on the front side V), this art would refer to as a single-sided friction plate. This variant is characterized in the figure and in the following description with the reference number 11, the corresponding core plate with the reference number 12 and the corresponding friction lining on the front side with the reference number 13v.

Since it cannot be ascertained from the representation according to FIG. 1 whether this is a double-sided friction plate 1 or a single-sided friction plate 11, this illustration includes both the reference number for a double-sided friction plate 1 according to the embodiment described immediately below, as well as a single-sided friction plate 11 described subsequently thereto.

From FIG. 1 one can see that the friction lining 3v, 13v (on the front side V) is provided with various grooves. There are provided, for example, grooves which are formed in the manner of a waffle, and grooves which overlie the waffle grooves and extend with straight lines from the inner edge of the disk ring to the outer edge thereof. The first type of groove is referenced in the drawings with reference numbers 4a, 4b, 14a and 14b. The second type of grooves are referenced in the drawings with 5a, 5b, 5c as well as 15a, 15b and 15c. In the following description it should be noted that the respective grooves, as well as the width and also the depth thereof, can be varied. Without limiting the concept of the invention it can be presumed that the grooves of the second type 5a, 5b, 15a, 15b are moulded deeper into the friction lining 3r, 3v, 13v than the grooves of the first type 4a, 4b, 14a, 14b.

Next, the embodiment according to FIG. 3 will be considered. This variant of the inventive disk is concerned with the above-mentioned double-sided friction plate 1. From the sectional view shown in detail one can see that the friction plate 1 is based upon a ring-shaped planar core plate 2 with the thickness D. On the front side V and the backside R of the core plate 2 there are situated respectively friction linings 3v and 3r. The friction linings 3r and 3v on the front and back side V, R of the core plate 2 exhibit an essentially homogenous thickness d which is essentially interrupted by grooves of first and second type 4a, 4b, 5a, 5b and 5c with the corresponding groove depths $t_4$ and $t_5$.

Since the front side and backside surfaces $O_{2v}$ or as the case may be $O_{2r}$ of the core plate 2 are flat or planar, the surface $O_{3v}$ or as the case may be $O_{3r}$ is in same manner also planar.

In accordance with the invention the friction linings 3v and 3r exhibit surface areas 6 on the front side V and the backside R of the core plate 2, which in comparison to the remaining planar surfaces $O_{3v}$ and $O_{3r}$ are raised by the amount $\Delta d$, wherein the raised surface areas 6 in the example are formed unitarily with the remainder of the friction lining 3v, 3r. These raised surface areas 6 are also to be found in the illustration according to FIG. 1. In the example there are shown multiple of the above mentioned grooves 4a, 4b, 5a, 5b and 5c in closed areas 6 of the surface area of the friction lining 3v, 3r, which are present in primarily regular intervals upon the ring shaped friction lining.

FIG. 4 shows a further alternative embodiment of an inventive disk. In the disk shown in FIG. 4 there is a so-called single sided friction plate 11, wherein the core plate 12 is provided with a friction lining 13v only on one side. This disk 11 also exhibits a ring shaped core plate 12 with an essentially homogenous thickness D. The friction lining provided on the front side thereof 13v exhibits a homogenous thickness d with diverse grooves 14a, 14b, 15a, 15b and 15c with the depths $t_{14}$ or as the case may be $t_{15}$. Further, with this alternative embodiment the friction lining 13 is formed partially raised. The surface areas 6 raised by the amount $\Delta d$ are based however not upon a surface-wise or area thickening $d+\Delta d$ of the friction lining 3v, 3r as in the above mentioned example, but rather a raising 6 of the surface $O_{13v}$ of the friction lining 13v by the amount $\Delta d^*$ is produced in that the backside R of the single-sided friction plate 11 is "protruded" on the side opposite to the friction lining 13 at the appropriate points with the aid of a suitable tool, so that as a consequence thereof the friction lining 13v on the front side V exhibits corresponding bosses with the height $\Delta d$.

FIG. 5 shows, on the basis of a series of illustrative examples, which cross-sectional shapes the above mentioned raised surfaces 6 could exhibit.

Figure 5A:
Figure 5B:
Figure 5C:
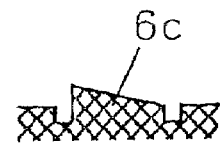

FIG. 5a shows a raised surface area 6a, which exhibits a bowed out shaped curved surface. FIG. 5b shows an example of a plateau surface area 6b with flat raised surface. Further FIG. 5c shows a rise 6c with conical cross-section shape.

Figure 6:
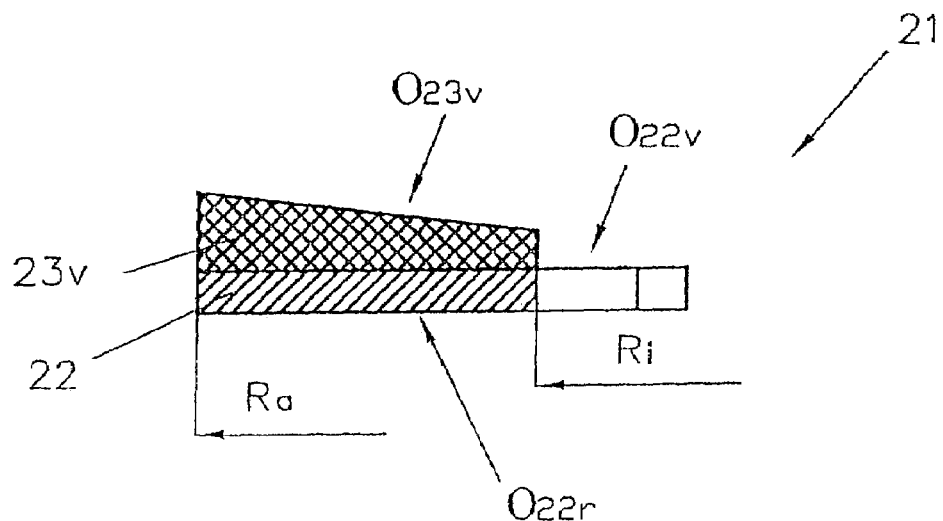

In FIG. 6 a final illustrative embodiment of an inventive disk 21 is shown. As in the above-mentioned embodiments the disk 21 is based upon a core plate 22 with a friction lining 23v provided on the front side. The friction lining 23v exhibits however in comparison to the above mentioned embodiments no raised surface areas. Instead, the upper surface $O_{23v}$ of the friction lining 23v is formed with a material growth going from the inner radius $R_i$ towards the outer radius $R_a$. In the example the material growth from inside towards outside is realized thereby, that the thickness of the friction lining 23v increases linearly from inner radius $R_i$ to outer radius $R_a$. It is however also conceivable, that instead the core plate, or even the friction lining together with the core plate, is/are formed with preferably continuous increasing thickness, so that an overall conical cross-section of the disk results. It has been found that, with appropriate selection of the thickness variation or, as the case may be, the springiness of the friction material of the friction lining $O_{22v}$, the clutch is over-compressed during engagement and the corresponding friction surfaces again lie essentially flush or planar parallel.

Reference Number List

| | |
|---|---|
| 1 | Double-sided friction plate |
| 2 | Core plate |
| 3v | Friction lining upon the front side |
| 3r | Friction lining upon the backside |
| 4a, 4b | Groove of first type |
| 5a, 5b, 5c | Groove of second type |
| 6, 6a, 6b, 6c | Raised surface area |
| 11 | Single-sided friction plate |
| 12 | Core plate |
| 13v | Friction lining upon the front side |
| 14a, 14b | Groove of first type |
| 15a, 15b, 15c | Groove of second type |
| 16 | Indentation (boss) |
| 21 | Single-sided friction plate |
| 22 | Core plate |
| 23v | Friction lining upon the front side |
| d | Thickness of the friction lining |
| $\Delta d$ | Distance |
| $t_4, t_{14}$ | Depth of groove of first type |
| $t_5, t_{15}$ | Depth of groove of second type |
| D | Thickness of the core plate |
| $\Delta d^*$ | Distance |
| V | Front side |
| R | Backside |
| $R_i$ | Inner radius |
| $R_a$ | Outer radius |
| $O_{3v}, O_{13v}, O_{23v}$ | Surface of the front side friction lining |
| $O_{3r}$ | Upper surface of the backside friction lining |
| $O_{2v}, O_{12v}, O_{22v}$ | Upper surface of the front side of the core plate |
| $O_{2r}, O_{12r}, O_{22r}$ | Surface of the backside of the core plate |

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. Disk (1, 11) for a force transmitting aggregate,
   with a core plate (2, 12) exhibiting a front side (V) and a backside (R), wherein
   the front side (V) and/or the backside (R) is provided with a friction lining (3v, 3r, 13v), thereby characterized, that
   the friction lining (3v, 3r, 13v) exhibits an essentially planar surface ($O_{3v}, O_{3r}, O_{13v}$), and that
   the friction lining (3v, 3r, 13v) exhibits at least one area (6) of the surface having a spring characteristic and the at least one area is raised in comparison to the planar surface ($O_{3v}, O_{3r}, O_{l3v}$); the raised at least one surface area (6) being formed unitarily with the remaining friction lining (3v, 3r, 13v), wherein the at least one raised area is compressed upon an engagement of the friction lining whereby the at least one raised area is displaced to be in essentially the same plane as the essentially planar surface; the raised surface area (6) of the friction lining (3v, 3r, 13v) is surrounded by one or more grooves (4a, 4b, 5a, 5b, 5c, 14a, 14b, 15a, 15b, 15c).

2. Disk (1, 11) according to claim 1, thereby characterized, that at least the raised surface area (6) of the friction lining (3v, 3r) exhibits a greater thickness ($d+\Delta d$) than the remaining areas.

3. Disk (1, 11) according to claim 1, thereby characterized, that the friction lining (3v, 3r), with the exception of the raised area (6) of the surface as well as the grooves (4a,

4b, 5a, 5b, 5c), exhibits an essentially uniform thickness (d), and in the raised area (6) of the surface exhibits a thickness (d+Δd) deviating from the uniform thickness (d).

4. Disk (1, 11) according to claim 1, thereby characterized, that the core plate (2, 12), at least in the raised area (6) of the surface of the friction lining (3v, 3r, 13v), exhibits a greater thickness than in the remaining areas.

5. Disk (1, 11) according to claim 1, thereby characterized, that the core plate (12) forms a raised surface area (6, 16).

6. Disk (1, 11) according to claim 1, thereby characterized, that the friction lining (3v, 3r, 13v) is formed of multiple component pieces.

7. Disk (1, 11) according to claim 1, thereby characterized, that the at least one raised surface area (6) functions as a spacer introduced or incorporated into the friction lining (3v, 3r, 13v).

8. Disk (1, 11) according to claim 1, thereby characterized, that the at least one raised surface area (6) is formed as a flat plateau, a bowed curved, or a cone.

9. Disk (1, 11) according to claim 1, wherein the force transmitting aggregate is a wet disk clutch.

10. Disk (21) for a force transmitting aggregate for a wet disk clutch,
- with a core plate (2, 12) exhibiting a front side (V) and a backside (R), wherein
- the front side (V) and the backside (R) are each provided with a friction lining (3v, 3r, 13v), the friction lining having a spring characteristic,
- thereby characterized, that the surface of the friction lining (23v) increasing in thickness in the radial direction, wherein the friction lining is compressed during an engagement of the force transmitting aggregate whereby the friction lining is substantially parallel to the core plate.

11. Disk (21) according to claim 10, thereby characterized, that the thickness of the friction lining (32v) increases conically from outside towards inside or increases conically from inside towards outside.

* * * * *